(12) United States Patent
O'Hagan et al.

(10) Patent No.: US 6,424,830 B1
(45) Date of Patent: *Jul. 23, 2002

(54) PORTABLE DATA COLLECTION NETWORK WITH TELEPHONE AND VOICE MAIL CAPABILITY

(75) Inventors: Timothy P. O'Hagan, The Woodlands, TX (US); Ynjium P. Wang, Fort Myers, FL (US)

(73) Assignee: Telxon Corporation, Holtsville, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 71 days.

(21) Appl. No.: 08/867,076

(22) Filed: Jun. 2, 1997

(Under 37 CFR 1.47)

Related U.S. Application Data

(63) Continuation-in-part of application No. 08/493,480, filed on Jun. 21, 1995, now abandoned, which is a continuation-in-part of application No. 08/332,592, filed on Oct. 31, 1994, now Pat. No. 5,521,366, which is a continuation-in-part of application No. 08/280,489, filed on Jul. 26, 1994, now Pat. No. 5,572,006.

(51) Int. Cl.[7] .................................................. H04B 7/00
(52) U.S. Cl. ........................................ 455/422; 455/564
(58) Field of Search ............................. 455/31.1, 31.2, 455/32.1, 31.3, 38.1, 38.4, 550, 564, 566, 569, 575, 90, 67.4, 422, 450, 445, 452, 455, 507, 517, 556, 561; 235/382

(56) References Cited

U.S. PATENT DOCUMENTS 4,210,802 A  7/1980  Sakai
4,409,470 A  10/1983  Shepard et al.

(List continued on next page.)

FOREIGN PATENT DOCUMENTS

| JP | 60129891 | 7/1985 |
| JP | 6367692 | 3/1988 |
| JP | 6383886 | 4/1988 |
| JP | 60264383 | 10/1990 |
| JP | 3198175 | 8/1991 |
| JP | 5242287 | 9/1993 |
| JP | 6162247 | 6/1994 |

* cited by examiner

Primary Examiner—Thanh Cong Le
(74) Attorney, Agent, or Firm—Kenner, Otto, Boisselle & Sklar, LLP

(57) ABSTRACT

A portable data terminal for use in a portable data collection network including a backbone network and a plurality of access points coupled to the backbone network. The portable data terminal includes a keypad for inputting data; a barcode reader for inputting barcode information an RF transceiver for wirelessly communicating at least one of data input via the keypad and barcode information read by the barcode reader to the backbone network by way of at least one of the plurality of access points a speaker; and a voice circuit operatively coupled to the RF transceiver and the speaker for receiving voice data via the RF transceiver, and for converting the voice data into a voice signal which is output through the speaker.

23 Claims, 9 Drawing Sheets

U.S. PATENT DOCUMENTS

| | | |
|---|---|---|
| 4,734,566 A | 3/1988 | Senda et al. |
| 4,766,300 A | 8/1988 | Chadima, Jr. et al. |
| 4,835,615 A | 5/1989 | Taniguchi et al. |
| 4,877,949 A | 10/1989 | Danielson et al. |
| 4,940,974 A * | 7/1990 | Sojka ........................ 455/31.1 |
| 4,952,966 A | 8/1990 | Ishida et al. |
| 4,962,432 A | 10/1990 | Ohtsuka et al. |
| 4,996,413 A | 2/1991 | McDaniel et al. |
| 5,010,580 A | 4/1991 | Vincent et al. |
| 5,019,699 A | 5/1991 | Koenck |
| 5,025,319 A | 6/1991 | Mutoh et al. |
| 5,080,456 A | 1/1992 | Katz et al. |
| 5,083,150 A | 1/1992 | Nagaski et al. |
| 5,128,769 A | 7/1992 | Aria et al. |
| 5,130,520 A | 7/1992 | Shepard et al. |
| 5,131,053 A | 7/1992 | Bernzott et al. |
| 5,168,149 A | 12/1992 | Dvorkis et al. |
| 5,184,005 A | 2/1993 | Ukai et al. |
| 5,187,356 A | 2/1993 | Chadima, Jr. et al. |
| 5,200,597 A | 4/1993 | Eastman et al. |
| 5,210,398 A | 5/1993 | Metlitsky |
| 5,235,167 A | 8/1993 | Dvorkis et al. |
| 5,237,365 A | 8/1993 | Miyazawa |
| 5,243,666 A | 9/1993 | Hasegawa et al. |
| 5,245,445 A | 9/1993 | Fujisawa |
| 5,258,604 A | 11/1993 | Behrens et al. |
| 5,262,871 A | 11/1993 | Wilder et al. |
| 5,272,538 A | 12/1993 | Homma et al. |
| 5,276,315 A | 1/1994 | Surka |
| 5,278,397 A | 1/1994 | Barken et al. |
| 5,291,009 A | 3/1994 | Roustaei |
| 5,293,238 A | 3/1994 | Nakano et al. |
| 5,296,690 A | 3/1994 | Chandler et al. |
| 5,308,960 A | 5/1994 | Smith et al. |
| 5,308,966 A | 5/1994 | Danielson et al. |
| 5,309,243 A | 5/1994 | Tsai |
| 5,314,631 A | 5/1994 | Katoh et al. |
| 5,315,095 A | 5/1994 | Marom et al. |
| 5,319,181 A | 6/1994 | Shellhammer et al. |
| 5,331,143 A | 7/1994 | Maron et al. |
| 5,332,892 A | 7/1994 | Li et al. |
| 5,340,973 A | 8/1994 | Knowles et al. |
| 5,345,266 A | 9/1994 | Denyer |
| 5,349,172 A | 9/1994 | Roustaei |
| 5,352,884 A | 10/1994 | Petrick et al. |
| 5,354,977 A | 10/1994 | Roustaei |
| 5,359,185 A | 10/1994 | Hanson |
| 5,386,271 A | 1/1995 | Maekawa et al. |
| 5,401,949 A | 3/1995 | Ziemacki et al. |
| 5,406,063 A | 4/1995 | Jelen |
| 5,408,084 A | 4/1995 | Brandorff et al. |
| 5,414,251 A | 5/1995 | Durbin |
| 5,418,357 A | 5/1995 | Inoue et al. |
| 5,420,635 A | 5/1995 | Konishi et al. |
| 5,420,943 A | 5/1995 | Mak |
| 5,448,293 A | 9/1995 | Kogane et al. |
| 5,468,947 A | 11/1995 | Danielson et al. |
| 5,468,950 A | 11/1995 | Hanson |
| 5,478,997 A | 12/1995 | Bridgelall et al. |
| 5,484,994 A | 1/1996 | Roustaei |
| 5,486,688 A | 1/1996 | Iima et al. |
| 5,496,992 A | 3/1996 | Madan et al. |
| 5,504,316 A | 4/1996 | Bridglall et al. |
| 5,778,314 A * | 7/1998 | Sudo et al. .................. 455/564 |
| 5,857,156 A * | 1/1999 | Anderson .................. 455/38.1 |

PORTABLE DATA COLLECTION NETWORK WITH TELEPHONE AND VOICE MAIL CAPABILITY

CROSS REFERENCE TO RELATED APPLICATIONS

This application is a continuation-in-part of application Ser. No. 08/493,480, filed Jun. 21, 1995, now abandoned which is a continuation-in-part of application Ser. No. 08/332,592, filed Oct. 31, 1994, now U.S. Pat. No. 5,521,366 and application Ser. No. 08/280,489, filed Jul. 26, 1994 now U.S. Pat. No. 5,572,006.

TECHNICAL FIELD

The present invention relates generally to wireless networks, and more specifically to wireless networks including one or more portable data terminals.

BACKGROUND OF THE INVENTION

In many industries portable data terminals are used to gather data from remote locations and relay such data to a central computing device. Usually the applications for such devices are for tracking the location and quantity of goods as they are moved throughout a manufacturing, distribution, warehouse, or retail facility, for example. Typical devices used in such applications include portable data terminals or portable pen computing devices known as workslates. In a batch data collection application, an operator will take a terminal into the facility and input data at various remote locations. The data may be hand input via a keypad or it may be electronically input through a barcode reader. When the operator has completed all of the data collection tasks, the operator transports the terminal to a docking station where, once connected, data is uploaded from the terminal a host computer.

In a wireless network, or RF data collection application, each portable data terminal includes an RF transceiver which transmits data to the host computing device within a very short period of time after the data is input into the terminal. If the data collection area is small, the RF transceiver may communicate directly with a corresponding RF transceiver at the host computer. If the facility is larger, the portable terminal transceiver may communicate with one of a plurality of access point transceivers geographically spaced throughout the facility. The access points in turn communicate with the host computer through a hardwired network such as Token Ring or Ethernet.

A problem associated with such data collection systems is that there is not a convenient system for voice communication among each person operating a data collection terminal and/or central managers, for example. While it has been possible in the past to communicate data information to another terminal or host computer via a keypad, barcode reader, or the like, it is desirable to provide for voice communication as well. For example, a person operating a terminal at one location in a facility may want to engage in conversation and/or leave a voice mail message with another person operating a terminal at a different location.

Cellular telephones have been available which provide for wireless voice communications. However, such technology requires its own specific communications network. Hence, it would be expensive and perhaps cost prohibitive to simply add a cellular telephone to a data collection terminal to permit voice communications. This would require. separate RF transceivers, access to commercial cellular service providers, etc., each of which would significantly add to the cost of owning and operating such a terminal.

Accordingly, there is a strong need in the art for a portable data collection network which includes portable data terminals which provide for voice communication. In particular, there is a strong need for a network in which the terminals do not require a separate RF transceiver or access to commercial cellular service providers. There is a strong need for a network which permits voice communication over the same network links utilized for data communications.

SUMMARY OF THE INVENTION

According to one aspect of the invention, a portable data terminal is provided for use in a portable data collection network including a backbone network and a plurality of access points coupled to the backbone network, the portable data terminal which includes a keypad for inputting data; a barcode reader for inputting barcode information an RF transceiver for wirelessly communicating at least one of data input via the keypad and barcode information read by the barcode reader to the backbone network by way of at least one of the plurality of access points a speaker; and a voice circuit operatively coupled to the RF transceiver and the speaker for receiving voice data via the RF transceiver, and for converting the voice data into a voice signal which is output through the speaker.

According to another aspect of the invention, a portable data terminal is provided for use in a portable data collection network including a backbone network, and a plurality of access points coupled to the backbone network, the portable data terminal which includes input means for inputting data; an RF transceiver for communicating with at least one device coupled to the backbone network via at least one of the plurality of access points, the RF transceiver being configured to communicate information in packets in accordance with a carrier sense multiple access (CSMA) protocol; a speaker; a microphone; and a control circuit, operatively coupled to the input means, the RF transceiver, the microphone, and the speaker, for selectively enabling the RF transceiver to transmit first data based on data input via the input means and second data based on a voice signal provided via the microphone, and for converting voice data received by the RF transceiver into a voice signal which is output through the speaker.

According to yet another aspect of the invention, a portable data terminal is provided for use in a portable data collection network including a backbone network and a plurality of access points coupled to the backbone network, the portable data terminal which includes a keypad for inputting data; a barcode reader for inputting barcode information; an RF transceiver for wirelessly communicating at least one of data input via the keypad and barcode information read by the barcode reader to the backbone network by way of at least one of the plurality of access points; a microphone; and a voice circuit operatively coupled to the RF transceiver and the microphone for transmitting voice data obtained from the microphone via the RF transceiver.

According to another aspect of the invention, a portable data terminal is provided including input means for inputting data; an RF transceiver for transmitting data input via the input means to a remote location; a memory; a speaker; a control circuit, operatively coupled to the RF transceiver and the speaker, for receiving voice data via the RF transceiver, storing the voice data in the memory as at least one voice mail message, and for selectively converting the at least one voice mail message to a voice signal which is output through the speaker; a display for displaying indicia of the at least one voice mail message stored in the memory; and an input operatively coupled to the control circuit for selecting the at least one voice mail message to be converted based on the indicia on the display.

According to still another aspect of the invention, a portable data collection network is provided, including a hardwired backbone network; a plurality of access points coupled to the backbone network; a plurality of portable data terminals, each of the plurality of portable data terminals including input means for inputting data; an RF transceiver for communicating with at least one device coupled to the backbone network via at least one of the plurality of access points, the RF transceiver being configured to communicate information in packets in accordance with a carrier sense multiple access (CSMA) protocol; a speaker; and a control circuit, operatively coupled to the input means, the RF transceiver, and the speaker, for selectively enabling the RF transceiver to transmit data based on data input via the input means and to convert voice data received by the RF transceiver into a voice signal which is output through the speaker.

To the accomplishment of the foregoing and related ends, the invention, then, comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

DESCRIPTION OF THE PREFERRED EMBODIMENTS

Figure 1:
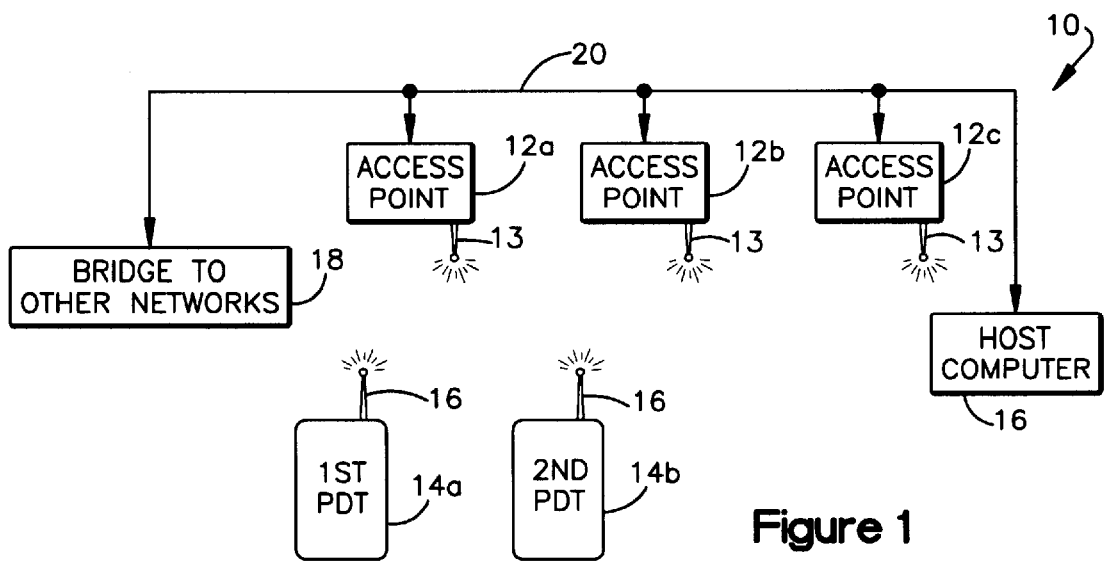
FIG. 1 is a block diagram of a portable data collection network in accordance with the present invention.

The present invention will now be described in detail with reference to the drawings. In the drawings, like reference numerals are used to refer to like elements throughout.

FIG. 1 shows a block diagram of a typical data collection network 10 which would be installed at a factory, warehouse, store or other facility where, for example, barcodes are used to track the movement of commodities throughout the facility. A plurality of radio-frequency (RF) access points represented by 12a, 12b and 12c each communicate via radio frequency and a corresponding antenna 13 with portable data terminals represented by 14a and 14b. As is described more fully below, each portable data terminal (referred to generally as 14) includes its own RF transceiver and antenna 16 for communicating with an access point (referred to generally as 12). When a terminal 14 is within a region of coverage of an access point 12 such that RF communications between the access point 12 and the terminal 14 are relatively error-free, the terminal 14 will register with the access point 12 as is conventional.

Data is communicated between an access point 12 and other access points or a host computer 16 via a backbone network 20. The backbone network 20 typically communicates data using an industry standard protocol such as Ethernet or Token Ring. A bridge 18 to other networks may also be communicatively coupled to the backbone network 20 such that data may be communicated to or from a plurality of other networks via the bridge 18. It will be appreciated that this conventional architecture enables any portable data terminal 14 and to communicate data with any other portable data terminal 14 in the network 10, the host computer 16, or any other device on another network linked to the backbone network 20 via bridge 18. For example, the terminal 14a would transmit information to the terminal 14b by first transmitting the information via RF communications to the access point 12 to which the terminal 14a was registered. That particular access point 12 would then forward the information along the backbone network 20 to the access point to which the terminal 14b was registered. Such access point would in turn forward the information to the terminal 14b via RF communications.

Similarly, a terminal 14 can communicate with any other device coupled to the backbone network 20 (e.g., the host computer 16, bridge 18, etc.). Devices which are coupled to the backbone network 20 can transmit information to a particular terminal 14 via the particular access point 12 to which the terminal 14 is registered. In the exemplary embodiment, devices within the network 10 transmit information in the form of information packets as is well known. Specifically, RF communications between the portable data terminals 14 and the access points 12 are carried out in accordance with a carrier sense multiple access (CSMA) packet based system protocol. Since multiple terminals will be registered with a given access point, an RF communication channel is not continuously available between the access point 12 and a particular terminal 14. Thus, an access point 12 communicates with a particular terminal 14 only at such time when an RF communication channel is available.

Figure 2:
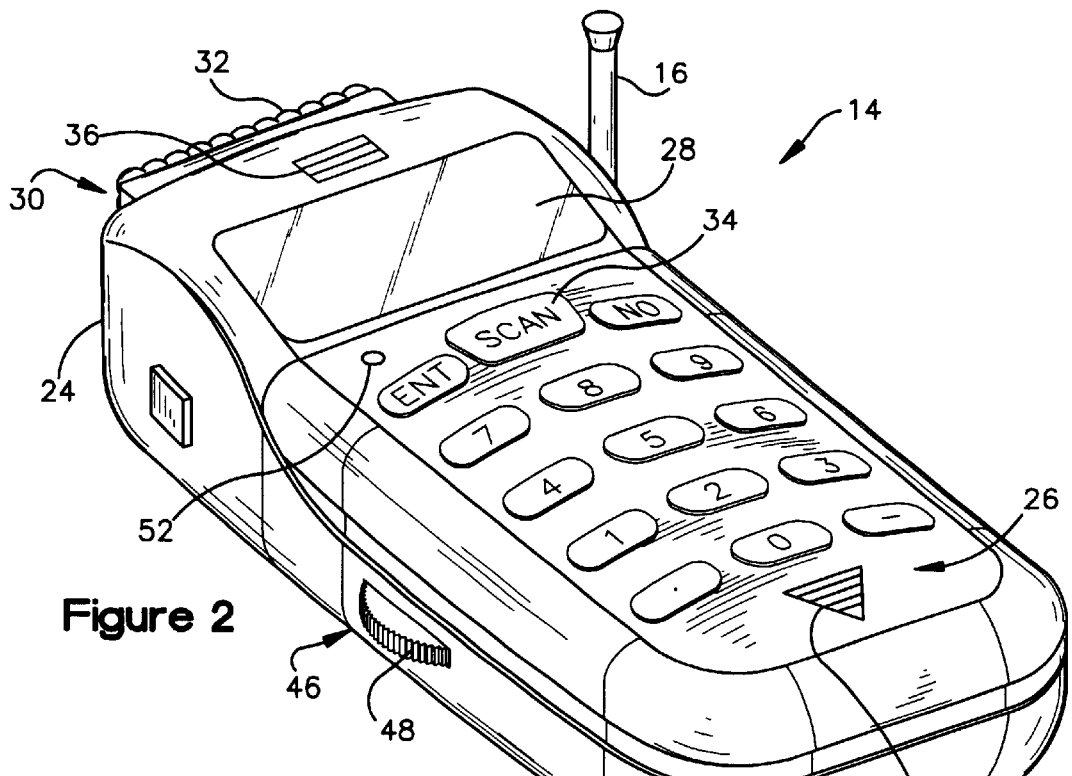
FIG. 2 is a perspective view of a portable data terminal in accordance with the present invention.
Figure 3:
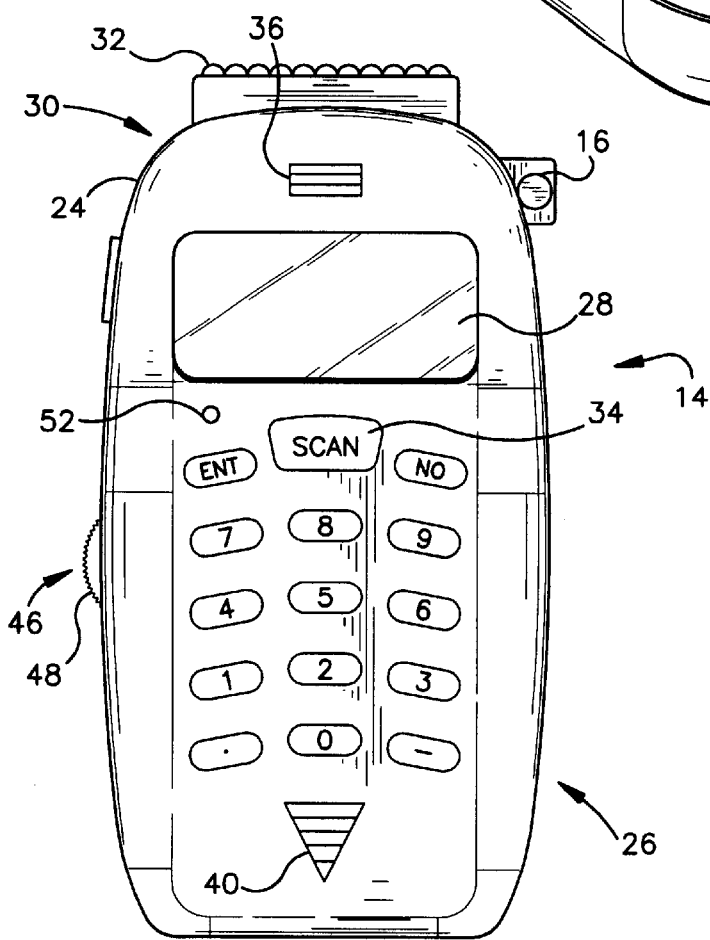
FIG. 3 is a top view of the portable data terminal in accordance with the present invention.

FIGS. 2 and 3 illustrate, respectively, a perspective and top view of an exemplary portable data terminal 14. The terminal 14 includes a housing 24 preferably constructed of a suitable impact resistant plastic that provides both durability and lightweight. Exposed on the housing 24 is a keypad 26 for permitting an operator to input data manually and to control various functions as is conventional. For example, operator may enter quantity information via numeric keys 0–9 included in the keypad 26. The terminal 14 also includes a display 28 for displaying information relating to the operation of the terminal 14. Such display preferably is a liquid crystal display (LCD) capable of displaying several lines of alphanumeric characters as well as graphics. In addition, the display 28 may function as a touch panel display to allow the input of information in addition to or in place of the keypad 26.

The terminal 14 includes a barcode reader 30 located at an upper end of the housing 24. An illuminator module 32 functions to illuminate a barcode symbol to be read, and barcode scan optics and electronics located within the housing 24 scans the barcode symbol. A detailed description of an exemplary illuminator module 32 and barcode reader 30 can be found in the aforementioned copending application Ser. No. 08/493,480, the entire disclosure of which is incorporated herein by reference. A scan button 34 included in the keypad 26 is used by the operator to activate the barcode reader 30 and initiate a barcode reading session. It will be appreciated that information which is input to the terminal 14 via the barcode reader 30 and/or the keypad 26 may be stored and subsequently transmitted to the backbone network 20 (FIG. 1).

The upper end of the housing 24 also includes a grated aperture 36 behind which a speaker 38 (FIG. 4) is positioned. In addition, a lower end of the housing 24 includes a grated aperture 40 behind which a microphone 42 (FIG. 4) is located. The speaker aperture 36 is positioned near the upper end of the terminal 14, forward of the display screen 28, and the microphone aperture 40. is positioned near the lower end of the terminal 46, below the keypad 26. This arrangement enables an operator to hold the terminal 14 with the keypad 26 and display 28 adjacent his or her cheek. The spacing between the speaker aperture 36 and the microphone aperture 40 is such that the speaker 38 will be positioned near the operator's ear, and the microphone 42 will be positioned near the operator's mouth. When held in this position, the operator is able to verbally communicate as if the terminal 14 were a telephone handset as is described more fully below.

Exposed on the left side of the housing 24 is a three-way switch 46. As is described in more detail below, the switch 46 is used by an operator to select among different functions in association with sending and receiving telephone calls and/or voice mail messages with the terminal 14 in accordance with the invention. In the exemplary embodiment, the switch 46 includes a thumb wheel 48 which may be rotated continuously in either a clockwise or counterclockwise direction. Rotation in a clockwise direction produces a first output and rotation in a counterclockwise direction produces a second output. In addition, the thumb wheel 48 may be depressed by an operator so as to move in a transaxial direction to produce a third output. As is discussed below, an operator may rotate the thumb wheel clockwise or counterclockwise in order to scroll up or down through lines on the display 28. Depressing of the thumb wheel 48 is used for selecting an entry on the display 28. For example, the thumb wheel 48 may be used to select a recipient of a telephone call or voice mail message, or to initiate a telephone call or send a voice mail message, for example. In addition, the operator may depress the thumb wheel 48 as part of a "push-to-talk" function as discussed below.

An exemplary switch 46 suitable for use in accordance with the invention is described in commonly assigned U.S. application Ser. No. 08/726,030, entitled "Programmable Mobile Device with Thumb Wheel", filed on Oct. 4, 1996. The entire disclosure of application Ser. No. 08/726,030 is incorporated herein by reference. However, it is understood that any suitable switch or switches for performing the functions described herein can be employed for purposes of this invention.

The terminal 14 further includes the aforementioned antenna 16 which preferably is pivotally mounted to the housing 24. The antenna 16 may be a small whip antenna, telescopic antenna, etc. RF communications between the terminal 14 and the access point 12 (FIG. 1) to which the terminal 14 is registered occur via the antenna 16 as will be appreciated.

The terminal 14 also includes a light emitting diode (LED) 52 for indicating receipt of one or more voice mail messages or an incoming telephone call. Although an LED 52 is used in a preferred embodiment, it will be appreciated that other types of display elements could be used without departing from the scope of the invention.

Figure 4:
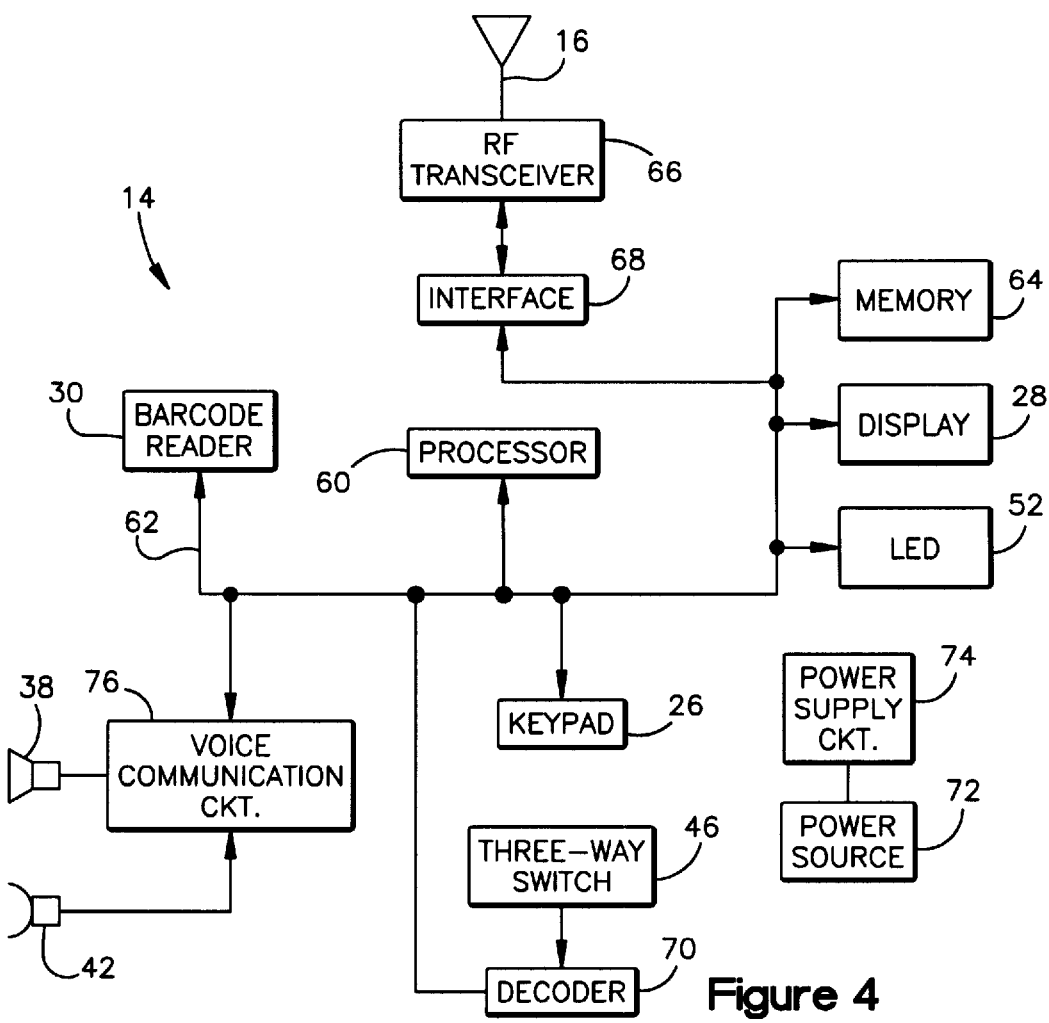
FIG. 4 is an electrical block diagram of the portable data terminal in accordance with the present invention.

Referring now to FIG. 4, a block diagram is shown representing the electronic circuitry contained within the housing 24 of the terminal 14. The terminal 14 includes a processor 60 which is programmed to control and to operate the various components within the terminal 14 in order to carry out the various functions described herein. The processor 60 may be, for example, an Intel 80486 or similar type microprocessor. The processor 60 is coupled to a local bus 62 within the terminal 14. The local bus 62 serves to communicate various control and data information between the components within the terminal 14 using conventional techniques.

The aforementioned keypad 26 allows an operator to input data to be communicated to the network backbone 20 such as inventory data, patient information, etc. Such information is delivered to the processor 60 via the local bus 62. This information may then be sent to the host computer 16 which serves as a central data location, for example. The barcode reader 30 is also coupled to the processor 60 via the local bus 62. Barcode information is scanned by the barcode reader 30, and the decoded data is provided to the processor 60 for further processing. For example, the scanned information may then be transmitted to the host computer 16. The display 28 is also connected to and controlled by the processor 60 via the local bus 62. As is exemplified with respect to FIGS. 7 and 8 discussed below, the display 28 serves as a means for identifying information stored within the terminal 14 and/or received over the network backbone 20 via an access point 12. In addition, the display 28 displays the names of the operators of other terminals 14 with which the present operator may want to communicate with via telephone or voice mail.

Figure 7:
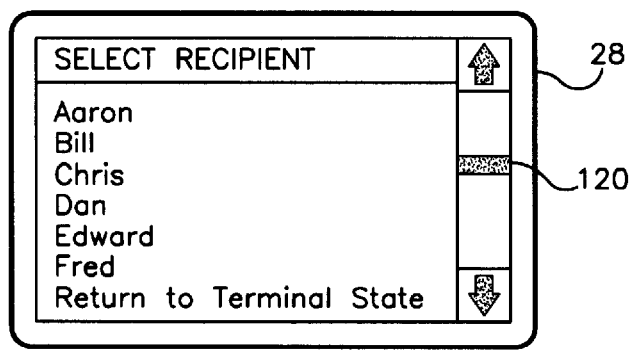
FIG. 7 is an exemplary menu provided on a display of the portable data terminal when in an initiate telephone call state or voice mail send state in accordance with the present invention.
Figure 8:
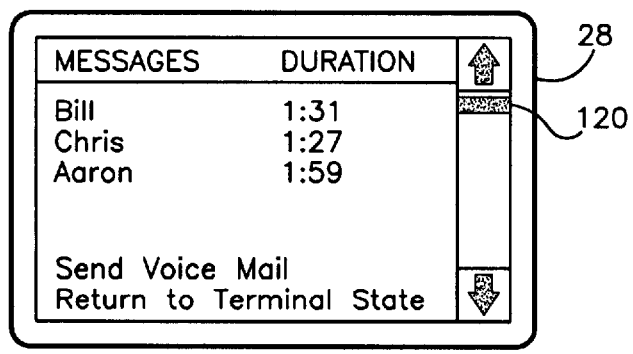
FIG. 8 is an exemplary menu provided on a display of the portable data terminal when in a voice mail replay state in accordance with the present invention.

Each terminal 14 also includes a memory 64 for storing program code executed by the processor 60 for carrying out the functions described herein. The actual code for performing such functions can be easily programmed by a person having ordinary skill in the art of computer programming in any of a number of conventional programming languages based on the disclosure herein. Consequently, further detail as to the particular code itself has been omitted for sake of brevity. The memory 64 also serves to store data which is input to the terminal 14 via the keypad 26 or barcode reader 30, for example. In addition, the memory 64 stores the network addresses of the various devices (e.g., other terminals 14, host computer 16, etc.) with which the operator of the terminal 14 may want to communicate. The memory 64 may also have stored therein "nicknames" associated with the corresponding network addresses. For example, the first name of the operator of a given terminal 14 is stored together with the network address of the terminal 14. When displaying a list of possible recipients on the display 28, the processor 60 may display the "nickname" rather than the network address as illustrated in FIGS. 7 and 8.

The network addresses stored in the memory 64 may be obtained using conventional wireless network techniques and/or be programmed into the terminal 14. The corresponding nicknames may be exchanged by including such data during an initialization routine in order that each terminal 14 transmits information regarding its nickname in combination with its network address.

The terminal 14 also includes its own radio frequency (RF) transceiver 66 connected to the processor 60 via an interface 68 and the local bus 62. The RF transceiver 66 includes an RF receiver (not shown) which receives RF transmissions from an access point 12 via the antenna 16 and demodulates the signal to obtain the digital information modulated therein. The digital information from the received RF signal is then provided by the transceiver 66 to the processor 60 for further processing. An example of a suitable RF receiver for use in the terminal 14 is the Model 025 Direct Sequence Spread Spectrum Radio Module, which is commercially available from Aironet Wireless Communications, Inc. of Akron, Ohio.

The RF transceiver 66 also includes an RF transmitter (not shown). In the event the terminal 14 is to transmit information to the backbone 20 in response to an operator input or as part of a telephone call or voice mail function as described herein, for example, the processor 60 forms digital information packets which are then delivered to the RF transmitter. According to conventional techniques, the RF transmitter in the transceiver 66 transmits an RF signal with the information packets modulated thereon via the antenna 16 to the access point 12 with which the terminal 14 is registered. The interface 68 may be any suitable interface for coupling the exchange of information between the processor 60 and the transceiver 66 via the local bus 62.

The three-way switch 46 is coupled to the processor 60 via a decoder circuit 70 and the local bus 62. The decoder circuit 70 may be any suitable circuit for providing an output to the processor 60 indicative of corresponding movement of the switch 46. Specifically, the decoder circuit 70 provides an output signal to the processor 60 indicative of whether the thumb wheel 48 is being rotated clockwise, counterclockwise, or is being depressed transaxially. As is discussed below, such switch operations are used for conducting telephone and voice mail functions.

The terminal 14 also includes a power source 72 such as a prismatic shaped lithium ion battery which provides power to a power supply circuit 74. The power supply circuit 74 regulates the output of the power source 72 and in turn provides operating power to the various components within the terminal 14. The power supply circuit 74 also functions to regulate recharging of the power source 72 in the case where the power source 72 is a rechargeable supply.

A primary feature of the present invention is a voice communication circuit (VCC) 76 which is coupled to the local bus 62. As is discussed below in relation to FIG. 5, the VCC 76 permits the collection, storage and/or exchange of compressed digital sound data as part of a telephone or voice mail function using the terminal 14. Sound data received from the microphone 42 is input to the VCC 76 and compressed so that it may be transmitted by the terminal 14 via the RF transceiver 66. In addition, compressed sound data which is received via the transceiver 66 from another terminal 14, for example, is decompressed by the VCC 76. The VCC 76 then outputs the received sound data through the speaker 38.

Figure 5:
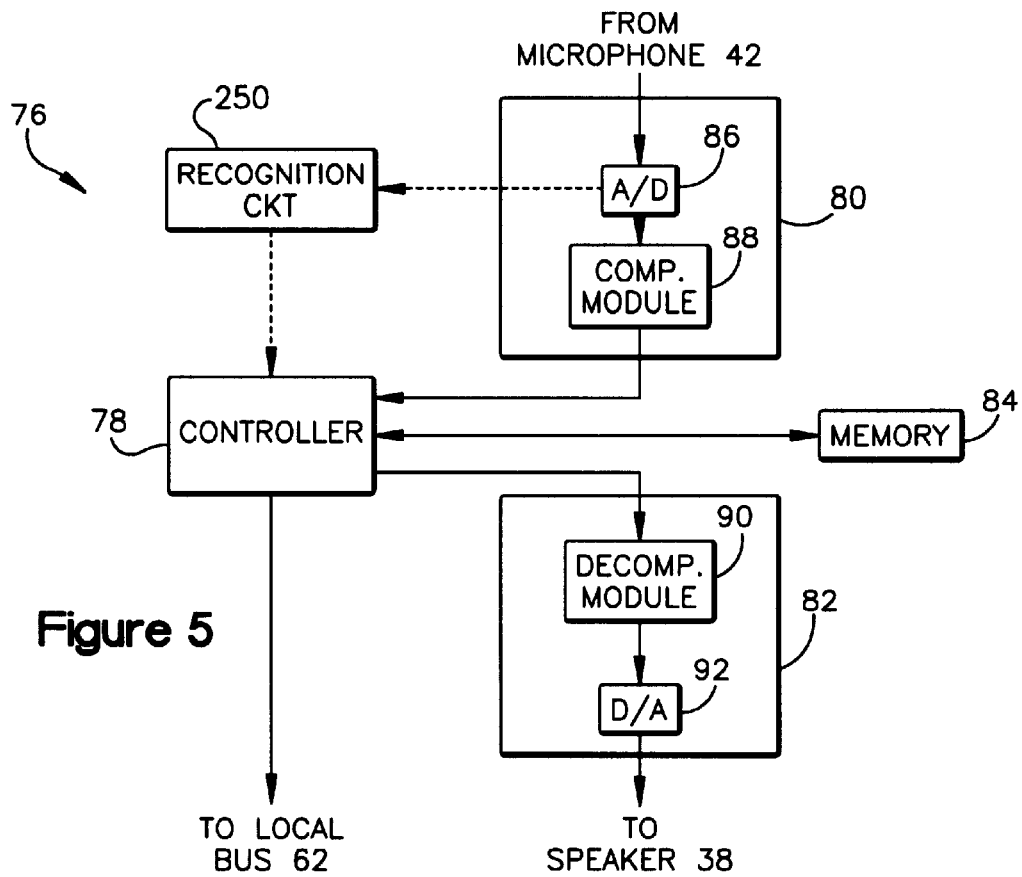
FIG. 5 is a detailed block diagram of a voice communication circuit within the portable data terminal.

FIG. 5 is a detailed block diagram of the VCC 76. The VCC 76 includes a controller 78 programmed to control the operations of the VCC 76 using known programming techniques. The controller 78 may be a dedicated controller as shown, or may instead be part of the functions carried out by the processor 60. In addition, the VCC 76 includes a voice input circuit 80 and a voice output circuit 82. The VCC 76 also includes a memory 84 for storing sound data. The memory 84 may be a dedicated memory separate from the memory 64, or alternatively may be part of the memory 64 without departing from the scope of the invention.

The microphone 42 (FIG. 4) receives audio sound waves from an operator of the terminal 14, and converts such sound waves into an electrical analog audio signal. In particular, the spoken words of the operator are converted to an analog audio signal which is input to the voice input circuit 80. The voice input circuit 80 includes an analog-to-digital (A/D) converter 86 which converts the output of the microphone 42 into digital voice data representing the spoken words of the operator. The digital voice data is output from the A/D converter 86 into a compression module 88 included in the voice input circuit 80. The compression module 88 then compresses the voice data using conventional techniques for compressing digital voice data. The compressed voice data is then provided to the controller 78 which temporarily stores the data in the memory 84.

Upon such time when the terminal 14 is to transmit the compressed voice data, the controller 78 provides the compressed voice data from the memory 84 to the processor 60. As is exemplified in FIG. 9 discussed below, the processor 60 includes the compressed voice data as part of a digital information packet which is transmitted to the intended recipient via the RF transceiver 66 (FIG. 4).

The terminal 14 also may receive digital information packets including compressed voice data as part of the intended telephone or voice mail functions. Such voice data is received via the RF transceiver 66 and is provided to the processor 60 for processing. As part of such processing, the processor 60 provides the compressed voice data from the received packet(s) to the controller 78 via the local bus 62. The controller 78 inputs the received compressed voice data to the voice output circuit 82. Specifically, the voice output circuit 82 includes a decompression module 90 which decompresses the compressed voice data as provided by the controller 78. The decompression algorithm is selected to correspond with the compression algorithm utilized by the compression module 88, as will be appreciated. The decompressed voice data is then input to a digital-to-analog (D/A) converter 92 included in the voice output circuit 82. The D/A converter 92 converts the decompressed voice data back into an electrical analog audio signal. The analog audio signal is then provided to the speaker 38 where it is converted to sound waves for listening by the operator.

Figure 6:
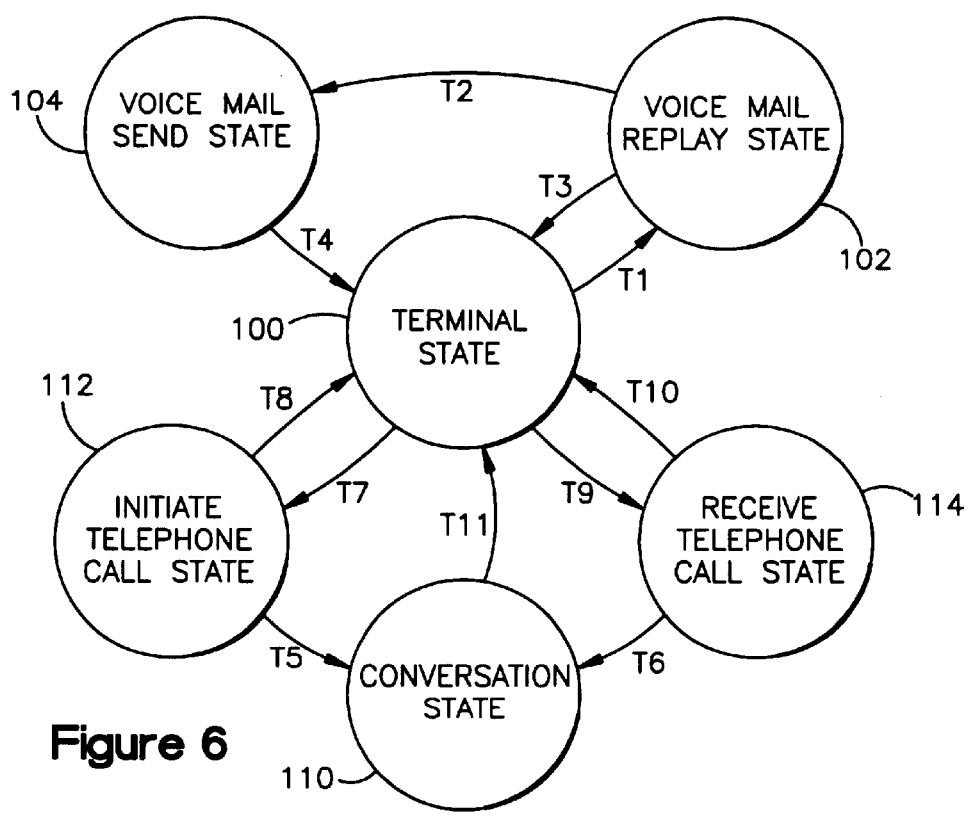
FIG. 6 is a state diagram illustrating the operation of the portable data terminal in accordance with the present invention.

Referring to FIG. 6, the terminal 14 is programmed to operate in accordance with the state diagram shown thereat. Briefly summarizing, the operator typically operates the terminal 14 for collecting data via the keypad 26 or barcode reader 30 in the terminal state 100. Such data is then communicated via the RF transceiver 66 to the host computer 16, for example. The operator may listen to voice mail messages at his or her convenience by transitioning to a voice mail replay state 102 via transition T1. The operator may also enter voice data and send a voice mail message by entering a voice mail send state 104 from the voice mail replay state via transition T2. Alternatively, the operator may cause the terminal 14 to transition from the voice mail replay state 102 back to the terminal state 100 by way of transition T3. Upon completion of sending a voice mail message, the operator may cause the terminal 14 to transition from the voice mail send state 104 to the terminal state 100 via transition T4.

While in a conversation state 1 10, the terminal 14 operates similar to a telephone to allow the operator to communicate with other devices in the network 10. The terminal 14 transitions to the conversation state 110 from the terminal state 100 via either an initiate telephone call state 112 (transition T5) or a receive call state 114 (transition T6). The operator causes the terminal 14 to transition from the terminal state 100 to the initiate telephone call state 112 when desiring to initiate a telephone call with another device in the network via transition T7. In the event the terminal 14 is unable to establish a telephone conversation, the terminal 14 reverts back from the initiate telephone call state 112 to the terminal state 100 via transition T8.

The terminal 14 will automatically transition (via transition T9) from the terminal state 100 to the receive telephone call state 114 upon receiving an information packet containing a "ring" indicator (discussed below in relation to FIG. 9). In the event the calling device "hangs up" prior to the operator of the terminal "answering" the incoming call, the terminal 14 will transition from the receive telephone call state 114 back to the terminal state 100 via transition T10. If the operator elects to terminate a telephone conversation while in the conversation state 110, the operator causes the terminal 14 to transition from the conversation state 110 back to the terminal state 100 via transition T11.

Referring briefly to FIG. 7, shown is an exemplary display format for the display 28 when the terminal 14 is in the initiate telephone call state 112 (or the voice mail send state 104). The processor 60 causes the "nicknames" to be displayed corresponding to the network devices (e.g., other terminals 14) with which the terminal 14 may communicate. In response to the operator rotating the three-way switch 46 clockwise or counterclockwise, the processor 60 causes a cursor 120 on the display to scroll up or down in relation to the list of possible "recipients". At the bottom of the display 28 appears an entry indicating a request to return to the terminal state 100 for conventional terminal operation. The operator may select a desired recipient or elect to return to the terminal state 100 by placing the cursor 120 adjacent the corresponding selection and depressing the switch 46 transaxially to inform the processor 60 of the desired selection.

FIG. 8 illustrates an exemplary display format for the display 28 when the terminal 14 is in the voice mail send state 104. At such time, the processor 60 displays the "nickname" and time duration of voice mail messages which have been received by the terminal 14 and stored in the memory 84. Again, rotational movement of the switch 46 causes the processor 60 to move the cursor 120 up and down in relation to the displayed messages. The operator may select a voice mail message to be played back by the VCC 76 by depressing the switch 46 transaxially while the cursor 120 is adjacent thereto. Included at the bottom of the display 28 are entries for sending a voice mail message and for returning the terminal 14 back to the terminal state 100. Such entries are selected by the operator by depressing the switch 46 transaxially as is discussed more fully below.

Figure 9:
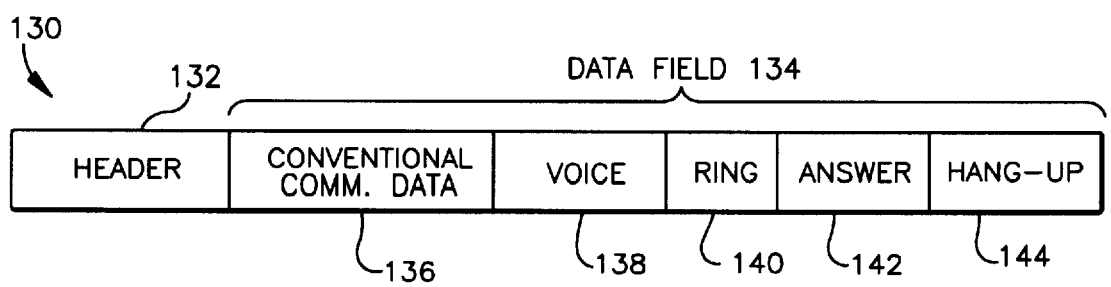
FIG. 9 is an exemplary packet format for transmitting conventional data and voice information in accordance with the present invention.

FIG. 9 shows the general format for digital information packets which are transmitted between the various devices in the network 10 in accordance with the invention. According to conventional protocol, each packet 130 is made up of a header field 132 and a data field 134. As is conventional, the header field 132 typically includes information such as the network address of the device sending the packet (i.e., the source address), and the network address of the device intended to receive the packet (i.e., the destination address). The data field 134, during conventional operation of the terminal 14 as a data terminal, includes a field 136 containing conventional data such as inventory data and the like. In addition, however, the data field 134 may include a voice field 138 containing compressed digitized voice data to be transmitted to the receiving device as described below. Furthermore, when a terminal 14 attempts to initiate a telephone call in state 112, the terminal 14 includes in a packet 130 a "ring" field 140 indicator to indicate to the receiving device the desire to establish a telephone call.

When a terminal 14 wants to "answer" a telephone call initiated by another device, the terminal 14 transmits a packet 130 to the calling device including an "answer" field 142 indicator. Finally, if a terminal 14 wants to terminate an established or attempted telephone call, the terminal 14 includes a "hang-up" field 144 indicator.

It will be appreciated that each terminal 14 (and other devices in the network 10 intended to participate in voice mail or telephone functions) is programmed to include and detect the voice field 138, ring field 140, answer field 142 and hang-up field 144 in the information packets 130. It is not necessary that all fields be in each packet, only that the fields be included at the appropriate time for carrying out the intended function as discussed below.

Replaying a Voice Mail Message

In each terminal 14, the processor 60 is programmed to receive packets 130 from other devices in the network 10 via the RF transceiver 66. As part of the decoding process, the processor 60 is programmed to detect the presence of voice data in a voice field 138. In the event the terminal 14 is not in the telephone conversation state 110, the processor 60 is programmed to interpret the incoming voice data in the packet as an incoming voice mail message. The processor 60 provides the data to the controller 78 together with the source address from the header field 132. The controller 78 then stores the data in the. memory 84 together with a tag identifying the source address and corresponding nickname. Such messages are stored. in the memory 84 until deleted by the operator via a delete key (not shown), for example. Upon receiving such a voice mail message(s), the processor 60 is programmed to cause the LED 52 to blink to indicate the receipt of such message(s).

When desiring to replay a voice mail message, the operator initiates a state change in the terminal 14 from the terminal state 100 to the voice mail replay state 102 (transition T1) by depressing the three way switch 46 transaxially twice in rapid succession. The processor 60 is programmed to detect such switch action and to transition the terminal 14 to the voice mail replay state 102. In the voice mail replay state 102, the menu will appear on display screen 28 as represented in FIG. 8. Included on the display 28 are entries corresponding to each of the voice mail messages which are stored in the memory 84 together with the corresponding nickname of the sender and the time duration. Such information can be provided by the controller 78 based on the known contents of the memory 84.

Figure 10A:
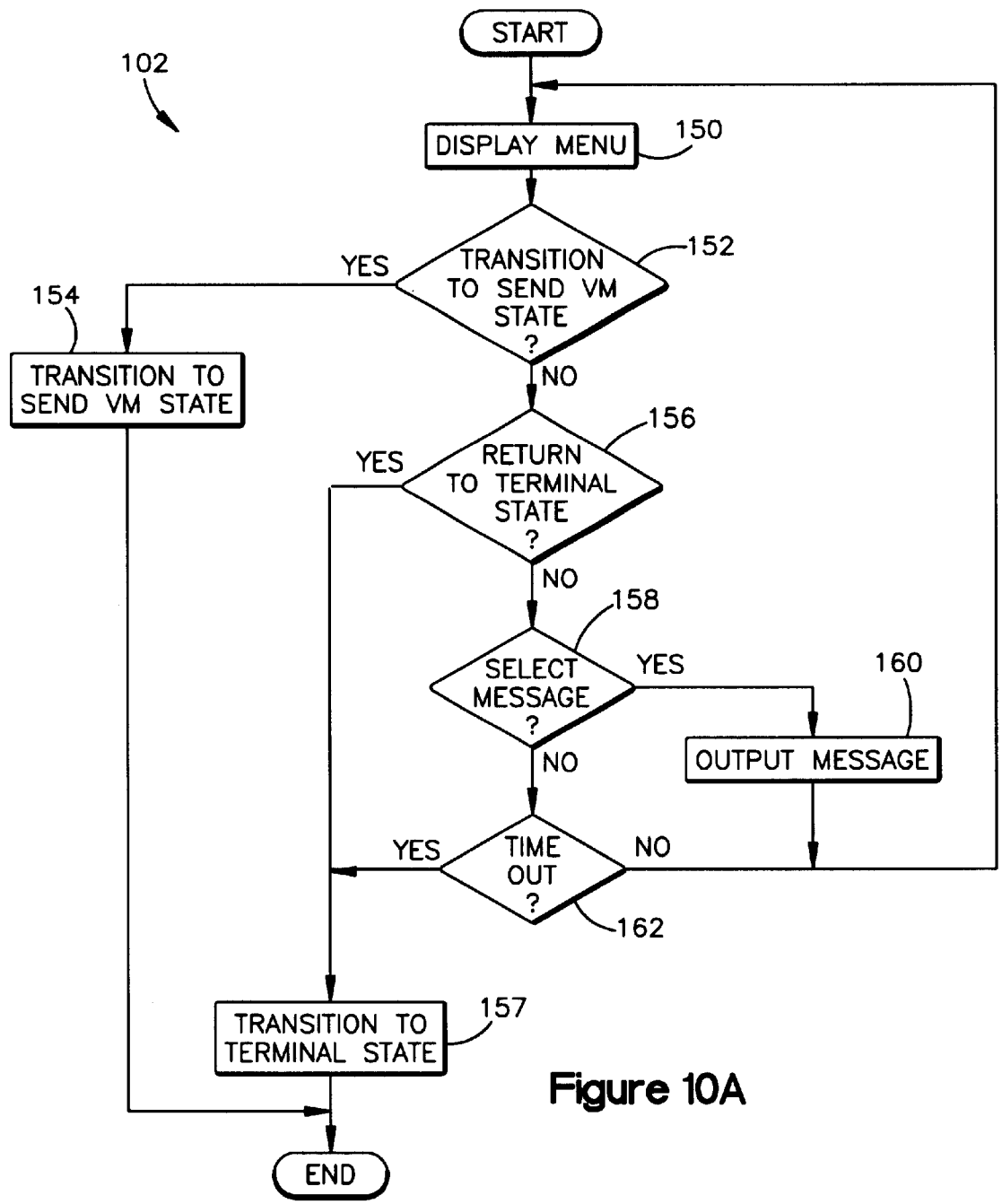
FIG. 10A is a flowchart illustrating the operation of the portable data terminal in a voice mail replay state.

The terminal 14 operates in the voice mail replay state 102 in accordance with the flowchart of FIG. 10A. Upon entering the voice mail replay state 102, the menu as shown in FIG. 8 is shown on the display 28 as represented by step 150. The operator moves the thumb wheel 48 of the three way switch 46 clockwise or counterclockwise to cause the cursor 120 to move upward and downward over each choice. The operator depresses the three way switch 46 transaxially to indicate his or her selection. The processor 60 identifies the selection based on the position of the cursor 120 at the time the switch 46 is depressed transaxially. If the operator selects the entry on the display 28 to send a voice mail message as detected at step 152, the processor 60 causes the terminal 14 to transition to the voice mail send state 104 (transition T2) at step 154.

If the operator does not select the option to send a voice mail message as determined in step 152, the processor 60 determines if the operator selects the entry to return to the terminal state 100 as determined at step 156. If yes, the processor 60 causes the terminal 14 to return to the terminal state 100 (transition T3) as represented by step 157. If at step 156 the operator does not select to return to the terminal state 100, the processor 60 proceeds to step 158 in which it determines if the operator selects one of the displayed voice mail messages based on a transaxial pressing of the switch 46. If yes, the processor 60 proceeds to step 160 in which it instructs the controller 78 to retrieve the selected voice mail message from memory 84 and to replay the voice mail message. Specifically, the VCC 76 causes the selected voice mail message to be played through the speaker 38 via the voice output circuit 82 as described above.

Following step 160, the processor 60 returns to step 150 where the menu is again displayed to the operator via the display 28. The above described steps are then repeated. If, in step 158, the operator does not make any selections while the menu is displayed, the processor 60 determines if a predetermined time-out period (e.g., ten seconds) has elapsed as represented by step 162. If yes, the processor 60 causes the terminal 14 to transition back to the terminal state 100 via step 157 (also transition T3). If, prior to the expiration of the time-out period, the operator makes a selection as determined in step 162, the processor 60 returns to step 150 as shown.

Sending a Voice Mail Message

Figure 10B:
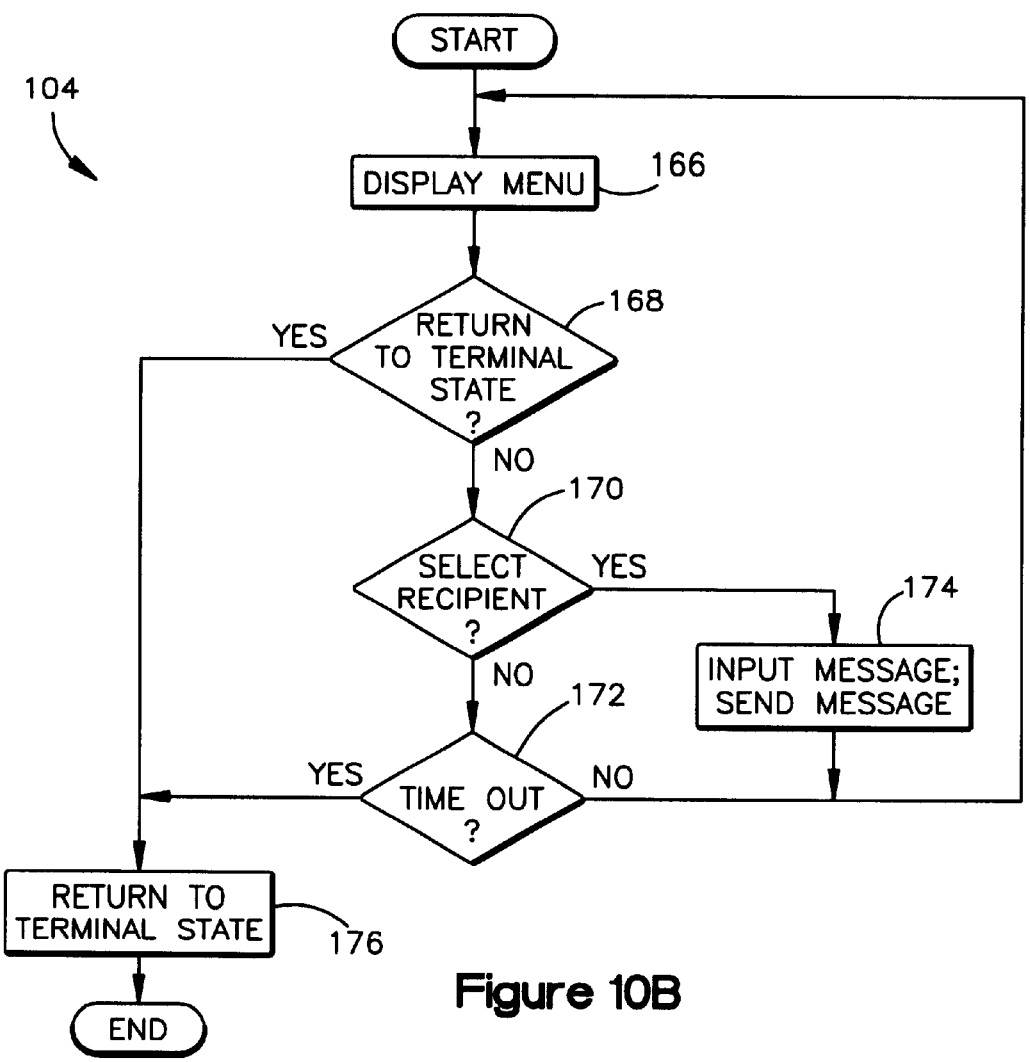
FIG. 10B is a flowchart illustrating the operation of the portable data terminal in a voice mail send state.

When the operator selects the entry to send a voice mail message at step 152 (FIG. 10A), and the terminal 14 enters the voice mail send state 104, operation of the terminal 14 is represented by the flowchart of FIG. 10B. Beginning in step 166, the processor 60 causes a menu of possible recipients to be displayed similar to that shown in FIG. 7. The list of possible recipients is made up of a list of network addresses and corresponding nicknames which are stored in the memory 64 (or optionally the memory 84). Such list is either programmed into the terminal 14 initially or is acquired by the terminal 14 from the information contained in the packets 130.

In step 168, the processor 60 determines if the operator selects from the displayed entries the option of returning to the terminal state 100. If yes, the processor 60 causes the terminal 14 to return to the terminal state 100 as represented by step 176 (transition T4). If no in step 168, the processor 60 determines in step 170 whether the operator has selected a recipient of the voice mail message from the nicknames shown on the display 28.

If the operator selects a recipient by depressing the switch 46 transaxially as determined at step 170, the processor 60 proceeds to step 174 in which it displays a prompt on the display 28. The prompt instructs the operator to press the switch 46 transaxially and to keep the switch depressed while reciting the intended voice mail message into the microphone 42. During such time, the output of the microphone 42 is digitized and compressed by the voice input circuit 80 in the manner described above. The compressed voice data is stored temporarily by the controller 78 in the memory 84. Upon the release of the switch 46, indicating the end of the recording of the voice mail message, the processor 60 accesses the compressed voice data and proceeds to form one or more packets 130 containing the compressed voice data in the voice data field 138. The source address in the header field 132 is set to indicate the network address of the terminal 14 sending the voice mail, and the destination address is set to indicate the network address of the selected recipient. Still in step 174, the processor 60 then proceeds to provide the packet(s) 130 to the RF transceiver 66 which then transmits the packets in the same manner as conventional data acquired by the input keypad 26 or the barcode reader 30, for example. The packet(s) 130 are then routed in via the network 10 according to conventional protocol to the selected recipient.

Following step 174, the processor 60 returns to step 166 in case the operator wishes to send another voice mail message. In step 170, the operator does not select a recipient within a predetermined time-out period (e.g., ten seconds) as determined in step 172, the processor 60 proceeds to step 176 in which it transitions back to the terminal state 100 (also transition T4).

In an alternative embodiment of the invention, the operator may choose to broadcast a voice mail message to two or more recipients. For example, in step 170 of FIG. 10B the operator may select more than one recipient by depressing the switch 46 transaxially once each time the cursor 120 is beside an intended recipient. The processor 60 is programmed to interpret such switch action as the selection of the corresponding recipient, and the processor 60 highlights each of the selected recipients on the display 28. Upon selecting each of the desired recipients, the operator depresses the switch 46 twice in rapid succession. The processor 60 is programmed to interpret such action as completion of the recipient selection process. The processor 60 then proceeds to step 174 as discussed above. In step 174, the processor 60 prompts the operator to input the voice mail message as discussed below. In addition, however, the processor 60 generates a separate packet including the voice mail data for each of the selected recipients. Each packet has as its destination address the network address of the corresponding selected recipient device. The processor 60 then proceeds to cause the RF transceiver 66 to transmit each of the packets to their respective destinations to effect the broadcast.

Initiating a Telephone Call

Figure 10C:
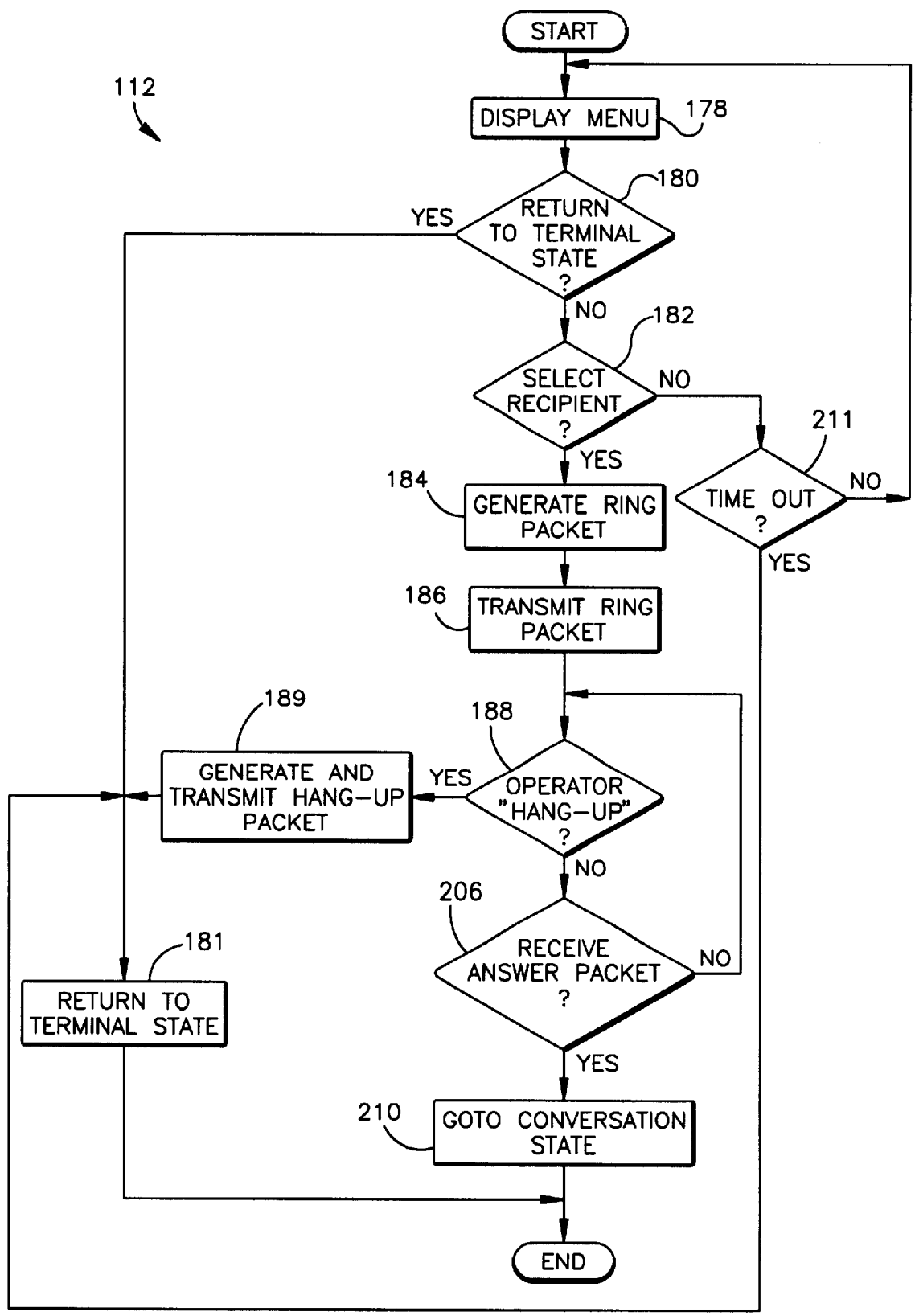
FIG. 10C is a flowchart illustrating the operation of the portable data terminal in an initiate telephone call state.

FIG. 10C represents operation of the terminal 14 in the initiate telephone call state 112. The operator may cause the terminal 14 to transition from the terminal state 100 to the initiate telephone call state 112 by depressing the switch 46 transaxially once. The processor 60 detects such switch action and causes the terminal to transition to the initiate telephone call state 112 (transition T7). Beginning in step 178, the processor 60 causes the display 28 to display the menu of possible recipients as represented in FIG. 7. If the operator selects the option on the display to return to the terminal state 100 as determined in step 180, the processor 60 returns to the terminal state 100 (transition T8) as represented at step 181.

If the operator does not elect to return to the terminal state 100 in step 180, the processor 60 proceeds to step 182 in which it determines if the operator selects one of the possible recipients shown on the display 28 with which to initiate a telephone call. If the processor 60 detects a selection based on a pressing of the switch 46 transaxially when the cursor 120 is adjacent the desired recipient, the processor 60 proceeds to step 184. In step 184, the processor 60 generates a "ring" packet 130 to be transmitted by the RF transceiver 66 to the selected recipient via the network 10. Such ring packet 130 includes a ring field 140 indicator (FIG. 9) to indicate to the device receiving the packet that the device transmitting the packet wishes to initiate a telephone call. The header field 132 of the ring packet includes the address of the terminal 14 transmitting the packet as the source address. The destination address of the ring packet 130 includes the network address corresponding to the recipient selected on the display 28 (as represented by the corresponding nickname).

Following step 184, the processor 60 proceeds to step 186 in which it transmits the ring packet to the selected recipient via the RF transceiver 66. Next, in step 188 the processor 60 determines if the operator of the terminal 14 initiating the telephone call has requested a "hang-up" (i.e., a request to terminate the initiation of the call). Specifically, if after step 186 the operator depresses the switch 46 once while still in the initiate telephone call state 112, the processor 60 detects such switch action in step 188. As a result, the processor 60 then proceeds to generate and transmit a "hang-up packet" 130 in step 189. A hang-up packet is a packet 130 which includes the hang-up field 144 identifier (FIG. 9) informing the receiving device that the call attempting to be initiated is being terminated by the calling device. The receiving devices such as other terminals 14 are programmed to transition from the receive telephone call state 114 to the terminal state 100 upon receipt of a hang-up packet 130 (transition T10).

The hang-up packet 130 generated in step 189 includes the network address of the calling terminal 14 as its source address, and the network address of the recipient selected in step 182 as the destination address. The processor 60 then proceeds to cause the RF transceiver 66 to transmit the hang-up packet 130. The packet is then routed to the selected recipient according to the conventional network protocol in the network 10. Following step 189, the processor 60 causes the terminal 14 to transition back to the terminal state 100 (also transition T8) as represented by step 181.

If the operator does not hang-up as determined in step 188, the processor 60 proceeds to step 206 in which it determines if the terminal 14 has received an "answer packet" 130 via the RF transceiver 66. An answer packet is a packet which includes an answer field 142 indicator. As is discussed below, a device which receives a ring packet 130 is programmed to respond with an answer packet 130 in order to establish telephone communication. The device sending the answer packet 130 includes its network address as the source address and the network address of the device which sent the ring packet 130 as the destination address. In the event the terminal 14 which is initiating the telephone call does not receive an answer packet as determined in step 206, the terminal 14 will continue to loop through steps 188 and 206. In this manner, the terminal 14 will remain in the initiate telephone call state 112 until the operator either "hangs-up" or an answer packet is received.

Upon receiving an answer packet as determined in step 206, the processor 60 causes the terminal 14 to transition from the initiate telephone call state 112 to the conversation state 110 (transition T5) as represented by step 210. If in step 182 the operator does not select a recipient within a predetermined time-out period (e.g., ten seconds) as determined in step 211, the processor 60 will cause the terminal 14 to revert back to the terminal state 100 (also transition T8) via step 181 as shown.

Carrying on a Conversation

Figure 10D:
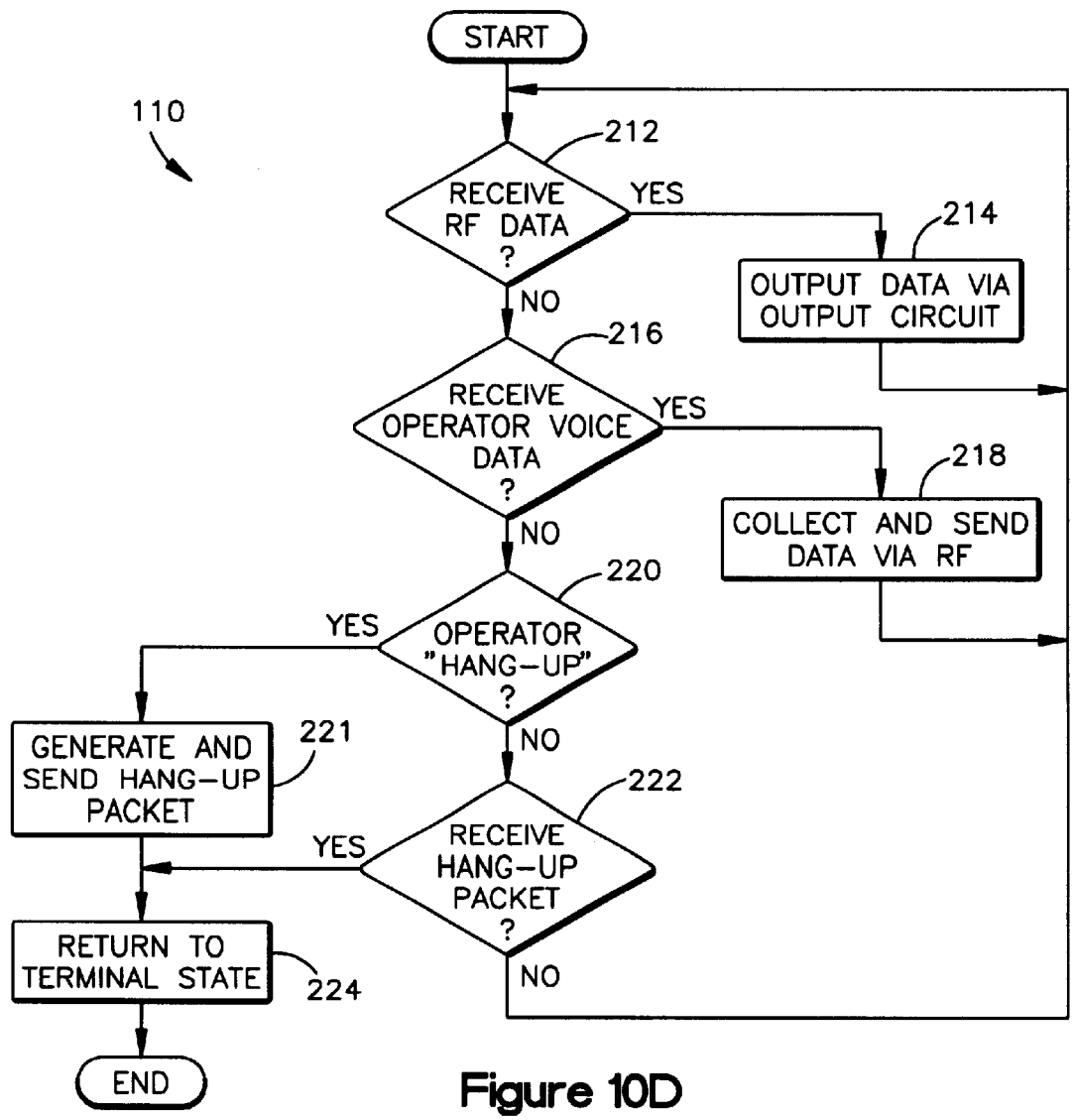
FIG. 10D is a flowchart illustrating the operation of the portable data terminal in a conversation state.

FIG. 10D represents the operation of the terminal 14 in the conversation state 110. Beginning in step 212, the processor 60 determines if the terminal 14 has received any packets 130 via the RF transceiver 66 which contain voice data in the voice field 138 (FIG. 9). If yes, such voice data is forwarded to the controller 78 which provides the data to the input of the voice output circuit 82. Specifically, the voice output circuit 82 is used to decompress the voice data and convert it back to an analog signal which is then output to the operator via the speaker 38 as represented in step 214. Following step 214, the processor 60 returns to step 212.

If no voice data is received via the RF transceiver 66 as determined in step 212, the processor 60 proceeds to step 216. In step 216 the processor 60 prompts the user via the display 28 to speak into the microphone 42 while depressing and holding the switch 46 in a transaxial manner. The processor 60 detects such switch movement and the processor 60 proceeds to step 218 in which the terminal 14 collects the voice data from the operator as spoken into the microphone 42. Specifically, the processor 60 instructs the controller 78 in the VCC 76 to cause the voice input circuit 80 to digitize and compress the voice data provided by the operator during such time that the switch 46 remains depressed. The voice data is temporarily stored in the memory 84. Upon the operator releasing the switch 46 to indicate the end of the current recited statement, the processor 60 in step 218 generates one or more packets 130 containing the compressed voice data in the voice field 138 to be sent to the device with which the terminal 14 is corresponding.

In particular, the processor 60 generates one or more packets 130 containing the compressed voice data with a source address corresponding to the network address of the terminal 14. The destination address of the packet(s) 130 is the network address of the device with which the terminal 14 is communicating as identified by the prior exchange of ring and answer packets discussed above. Still in step 218, the processor 60 then provides the packets to the RF transceiver 66 for transmission to the receiving device. Following step 218, the processor 60 returns to step 212.

Steps 212 through 218 are repeated until such time as the conversation is terminated as determined in either step 220 or step 222. The steps are carried out in relative real time such that the voice conversation based on the exchange of packets containing compressed voice data resembles that of a conventional telephone conversation. Assuming there are no significant network delays in transmitting the packets 130 from their source to their destination, conversation will be audibly pleasing to the operators involved. Although the exchange of packets using the same RF transceiver 66 is not full duplex communication, the operators will soon become accustomed to the corresponding protocol based on the use of the switch 46 in a "push-to-talk" manner.

If in step 216 the processor 60 determines that operator voice data is not being provided, the processor 60 proceeds to step 220. In step 220, the processor 60 determines if the operator of the terminal 14 requests a hang-up (i.e., termination of the conversation). For example, in an exemplary embodiment if the operator depresses the switch 46 transaxially twice in rapid succession, the processor 60 is programmed to interpret such switch action as a request for a hang-up. In such case, the processor 60 proceeds from step 220 to step 221 in which the processor 60 generates and transmits a hang-up packet 130. In the same manner described above in relation to step 189 in FIG. 10C, the processor 60 generates a hang-up packet 130 which includes an indicator in the hang-up field 144. The source address of the hang-up packet is the network address of the terminal 14, and the destination address is the network address of the device with which the terminal 14 is communicating. The processor 60 proceeds to transmit the hang-up packet to the receiving device via the RF transceiver 66. Following step 221, the processor 60 causes the terminal 14 to transition back to the terminal state 100 (transition T11) as represented by step 224.

If in step 220 the processor 60 determines that the operator has not requested a "hang-up", the processor 60 proceeds to step 222. In step 222 the processor 60 determines if a hang-up packet 130 has been received from the device with which the terminal 14 has been communicating (e.g., another terminal 14). Specifically, packets 130 received by the RF transceiver 66 are decoded and the processor 60 determines if such a hang-up packet with the hang-up field 144 indicator has been received. Such packet would be generated and transmitted, for example, by virtue of another terminal 14 with which the present terminal 14 was communicating proceeding to step 221 discussed above. If such a hang-up packet 130 is received as determined in step 222, the processor 60 causes the terminal 14 to return to the terminal state 100 (also transition T11) as represented by step 224. Otherwise, the processor 60 proceeds from step 222 back to step 212 where the above described process is repeated.

Accordingly, a telephone call from a terminal 14 to another device, such as another terminal 14, is initiated similar to a conventional telephone call where a desired recipient is selected and effectively "dialed" by sending a "ring" packet 130. The connection is established by the generation of an "answer" packet 130 by the called device. Thereafter, communications occur in a "push-to-talk" format similar to that used in citizen band radio or with walkie-talkies, for example. The telephone call is then terminated similar to a conventional telephone call by one of the devices "hanging-up".

In another embodiment, step 216 in the conversation state is carried out substantially continuously. Namely, the VCC 76 is substantially continuously digitizing and compressing the output of the microphone 42. The compressed digitized output is then periodically transmitted in step 218, by the RF transceiver 66, in the voice field 138 of packets 130 every few seconds, for example. While the advantage of such embodiment is that it eliminates the "push-to-talk" requirements and better emulates a conventional telephone call, it increases the amount of packet traffic being routed through the access points 12 and the rest of the network 10.

Receiving a Telephone Call

Figure 10E:
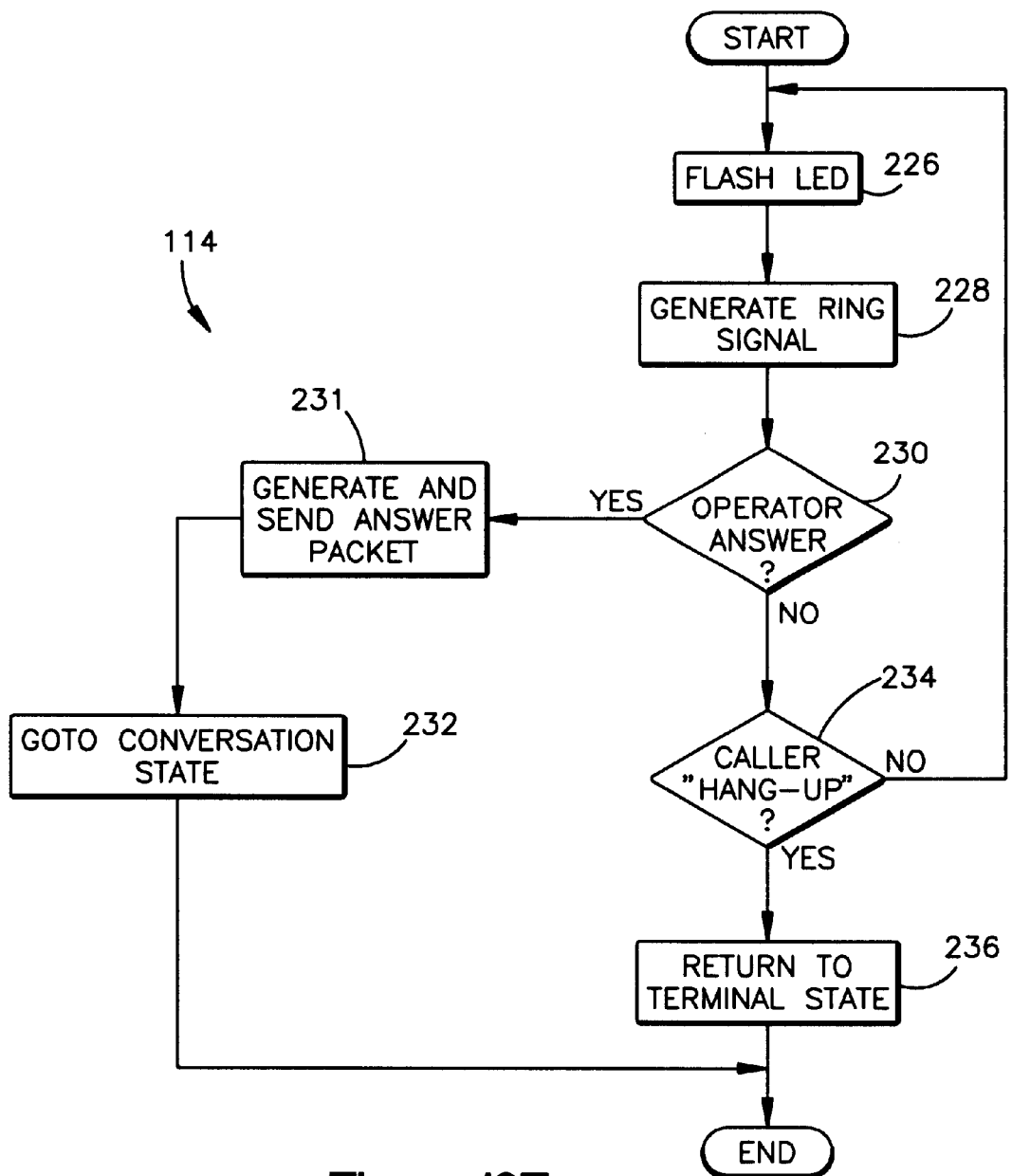
FIG. 10E is a flowchart illustrating the operation of the portable data terminal in a receive telephone call state.

FIG. 10E illustrates the operation of a terminal 14 when initially receiving a telephone call. As mentioned above, the terminal 14 will ordinarily be in the terminal state 14. The processor 60 is programmed to detect when a ring packet 130 is received via the RF transceiver 66, the ring packet 130 including a ring field 140 indicator (see, FIG. 10C; steps 184, 186 discussed above). Upon receiving such a ring packet 130, the processor 60 causes the terminal 14 to transition from the terminal state 100 to the receive telephone call state 114 (transition T9).

Referring to FIG. 10E, the receive telephone call state 114 begins with step 226 in which the processor 60 causes the LED 52 to flash intermittently to indicate receipt of a telephone call. Following step 226, the processor 60 proceeds to step 228 in which the processor 60 instructs the controller 78 to generate a ring signal which is sounded via the speaker 38 to audibly indicate receipt of a telephone call. For example, the controller 78 may retrieve from the memory 84 data representing a digitized ringing sound. Such data is input to the voice output circuit 82 which decompresses the data and outputs an analog ringing signal to the speaker 38.

Following step 228, the processor 60 proceeds to step 230 in which it determines if the operator of the terminal 14 has answered the incoming telephone call. Specifically, the processor 60 is programmed to detect whether the operator depresses the switch 46 transaxially once upon the terminal entering the receive telephone call state 114. The processor 60 is programmed to interpret such switch action as an "answering" of the call by the operator. Hence, if the processor 60 detects such switch action in step 230, the processor 60 proceeds to step 231.

In step 231, the processor 60 generates and transmits an "answer" packet. Specifically, the processor 60 generates a packet 130 which includes the answer field 142 indicator (FIG. 9). The source address of the answer packet is the network address of the terminal 14. The destination address of the answer packet is the network address of the device which sent the ring packet which caused the terminal 14 to transition into the receive telephone call state 114 from the terminal state 100. The identity and network address of such device may be obtained by the processor 60 from the header information included in the ring packet. Specifically, the network address from the source address in the ring packet is used as the destination address in the answer packet 130. The answer packet 130 is then delivered by the processor 60 to the RF transceiver 66 in step 231 so that it is transmitted to its destination. Following step 231, the processor 60 causes the terminal 14 to transition to the conversation state 110 (transition T6) as represented by step 232.

If in step 230 the operator does not answer by depressing the switch 46, due to unavailability for example, the processor 60 proceeds to step 234. In step 234 the processor 60 determines if a hang-up packet 130 has been received via the RF transceiver 66 from the device initiating the call. As is discussed above in relation to steps 188 and 189 of FIG. 10C, a device may terminate a call prior to it being established by transmitting a hang-up packet 130. If a hang-up packet 130 is received as detected by the processor 60 based on the presence of an indicator in the hang-up field 144 (FIG. 9), the processor 60 proceeds to step 236. In step 236 the processor 60 causes the terminal 14 to transition out of the receive telephone call state 114 and back to the terminal state 100 (transition T10). If, on the other hand, the terminal 14 does not receive a hang-up packet 130 as determined in step 234, the processor 60 returns to step 226 and the above described steps are repeated.

According to another embodiment, steps 231 and 232 may be combined in the sense that the operator of the called device may want to include voice data in the "answer" packet 130 to begin the conversation. For example, in addition to including the answer field 142 indicator, the "answer" packet 130 may include compressed digitized voice data input by the operator of the called device. While depressing the switch 46 transaxially to answer the incoming call (step 230), the operator may hold the switch 46 in and speak into the microphone 42. As an example, the operator may recite "Hello, this is Tim". Upon releasing the switch 46, the converted voice data is included in the "answer" packet 130 which is sent in step 231. The calling device, upon receiving the "answer" packet 130 (step 206; FIG.

10C), converts the voice data included in the packet back to a voice signal which is output through the speaker 38 upon transitioning to the conversation state 110.

Conference Calling

Another embodiment of the present invention provides for conference calling between three or more parties. Referring again to FIG. 10C, the operator of a terminal 14 may wish to initiate a telephone call with two or more recipients. Thus, in step 182 the operator may select two or more recipients in the same manner discussed above in relation to broadcasting a voice mail message. Then, in step 184 the processor 60 generates a separate "ring" packet 130 destined for each of the recipients selected in step 182. The processor 60 then proceeds to transmit each of the "ring" packets in step 186 via the RF transceiver 66.

The ring packet 130 will cause each of the selected recipients, provided they are available, to respond with an "answer" packet 130 and transition to the conversation state (steps 231 and 232; FIG. 10E). Upon receiving at least one "answer" packet 130, the calling terminal 14 transitions to the conversation state (steps 206 and 210; FIG. 10C). In addition, the processor 60 in the calling terminal 14 is programmed to establish and maintain a list in memory 64 of the selected recipients which responded with an "answer" packet 130, or which subsequently sent a "hang-up" packet 130 (step 221, FIG. 10C). As a result, the calling terminal 14 maintains this list of active participants in the conference call.

The processor 60 within the calling terminal 14 is programmed to include the network addresses of those participants which are currently active in a "conference address" field (not shown) of each packet 130 transmitted during the conversation state 100. The processor 60 is programmed to transmit packets 130 including voice data and the conference address information to each active participant during the conversation state 110 (steps 216 and 218; FIG. 10D). The devices of the called recipients, on the other hand, are programmed to detect the addresses in the "conference address" field of each packet as part of step 214 (FIG. 10D). The devices are then programmed to transmit separate packets 130 with their own voice data (steps 216 and 218) to each of the active participants as identified in the most recent "conference address" field. In this manner, the terminal 14 initiating the call and all the selected recipients can communicate with one another simultaneously. Upon the processor 60 of the calling terminal 14 receiving a "hang-up" packet from the last of the selected recipients which had been active, the processor 60 causes the terminal 14 to transition back to the terminal state 100 (steps 222 and 224; FIG. 10D).

If the operator of the calling terminal 14 chooses to hang up in step 220 (FIG. 10D) while one or more selected recipients remain active, the processor 60 proceeds to step 221. In this embodiment, the processor 60 causes a "hangup" packet 130 to be transmitted via the RF transceiver 66 to each of the active recipients. Thus, each of the active recipients is returned to its terminal state. In this context, the calling terminal 14 may unilaterally terminate the entire conference call by hanging up.

Accordingly, the present invention provides a portable data terminal which is capable of sending/receiving voice mail and/or carrying out telephone communications within a data collection network. The data terminal is able to transmit and receive voice communications using the same RF transceiver and routing protocols as used for communicating conventional data within the network. It is not necessary to utilize commercial cellular telephone services.

Although the invention has been shown and described with respect to certain preferred embodiments, it is obvious that equivalents and modifications will occur to others skilled in the art upon the reading and understanding of the specification. For example, in another embodiment of the network 10 the host computer 16 or another network device is used to store voice mail messages for the respective terminals 14 rather than the messages being stored locally in the corresponding terminal 14. In such embodiment, packets 130 containing voice mail data are transmitted by the terminals 14 to the host computer 16. Each packet includes a tag identifying the particular device (e.g., another terminal 14) for which the voice mail message is intended. Each terminal 14 is then programmed to poll the host computer 16 periodically in order to retrieve the voice mail packets which may have been received by the host computer 16 for the particular terminal 14.

Referring again to FIG. 5, an alternate embodiment of the VCC 76 may include a voice recognition circuit 250 as shown in phantom. The voice recognition circuit is connected to the output of the A/D converter 86 and is designed to detect whether the voice being received by the microphone 42 corresponds to the voice of an authorized operator of the terminal 14. If a match is detected by the voice recognition circuit 250, the circuit 250 provides an enable signal to the controller 78 which permits the terminal 14 to be operated. If there is no match, the voice recognition circuit 250 disables the controller 78 and the entire terminal 14. Thus, such circuit 250 provides an added measure of security.

The present invention includes all such equivalents and modifications, and is limited only by the scope of the following claims.

Which is claimed is:

1. A portable data terminal for use in a portable data collection network including a backbone network and a plurality of access points coupled to the backbone network, the portable data terminal comprising:

a keypad for inputting data;

a barcode reader for inputting barcode information;

an RF transceiver for wirelessly communicating at least one of data input via the keypad and barcode information read by the barcode reader to the backbone network by way of at least one of the plurality of access points;

a speaker; and a voice circuit operatively coupled to the RF transceiver and the speaker for receiving voice data via the RF transceiver, and for converting the voice data into a voice signal which is output through the speaker, the voice data originating from another portable data terminal.

2. The portable data terminal of claim 1, wherein the voice circuit comprises a memory for storing voice data received via the RF transceiver.

3. The portable data terminal of claim 2, wherein the memory stores voice data which is acquired as multiple voice messages.

4. The portable data terminal of claim 3, further comprising a display for displaying indicia of the multiple voice messages, and means for permitting an operator to select at least one of the multiple voice messages to be output through the speaker based on the displayed indicia.

5. The portable data terminal of claim 1, further comprising a microphone, and wherein the voice circuit is operatively coupled to the microphone to convert a voice signal output from the microphone to outgoing voice data which is transmitted by the RF transceiver.

6. The portable data terminal of claim 1, wherein a device coupled to the backbone network initially stores the voice data intended for the portable data terminal, and the portable data terminal periodically polls the device in order to prompt the device to transmit the voice data to the portable data terminal.

7. The portable data terminal of claim 6, wherein the device is a host computer coupled to the backbone network.

8. The portable data terminal of claim 1, wherein the voice data from another portable data terminal is transmitted via the backbone network.

9. The portable data terminal of claim 8, wherein the voice data from the another portable data terminal is transmitted from the another portable data terminal to the backbone network by way of another of the plurality of access points.

10. The portable data terminal of claim 1, wherein the another portable data terminal comprises a keypad for inputting data; a barcode reader to inputting barcode information; an RF transceiver for wirelessly communicating at least one of data input via the keypad and barcode information read by the barcode reader to the backbone network by way of at least one of the plurality of access points; a microphone; and a voice circuit operatively coupled to the RF transceiver and the microphone for transmitting voice data obtained from the microphone via the RF transceiver.

11. The portable data terminal of claim 1, wherein the portable data terminal, the portable data collection network including the backbone network and the plurality of access points and the another portable data terminal are disposed within a facility and facilitate communication among persons remotely located within the facility.

12. A portable data terminal for use in a portable data collection network including a backbone network and a plurality of access points coupled to the backbone network, the portable data terminal comprising:

a keypad for inputting data;

a barcode reader to inputting barcode information;

an RF transceiver for wirelessly communicating at least one of data input via the keypad and barcode information read by the barcode reader to the backbone network by way of at least one of the plurality of access points;

a microphone; and a voice circuit operatively coupled to the RF transceiver and the microphone for transmitting voice data obtained from the microphone via the RF transceiver, the voice data destined to another portable data terminal.

13. The portable data terminal of claim 12, wherein the voice circuit is operative to transmit the same voice data to a plurality of different devices via the RF transceiver.

14. The portable data terminal of claim 12, wherein the voice data to another portable data terminal is transmitted via the backbone network.

15. The portable data terminal of claim 14, wherein the voice data to another portable data terminal is transmitted from the backbone network to the another portable data terminal by way of another of the plurality of access points.

16. The portable data terminal of claim 12, wherein the another portable data terminal comprises a keypad for inputting data; a barcode reader to inputting barcode information; an RF transceiver for wirelessly communicating at least one of data input via the keypad and barcode information read by the barcode reader to the backbone network by way of at least one of the plurality of access points; a speaker; and a voice circuit operatively coupled to the RF transceiver and the speaker for receiving voice data via the RF transceiver, and for converting the voice data into a voice signal which is output through the speaker.

17. The portable data terminal of claim 12, wherein the portable data terminal, the portable data collection network including the backbone network and the plurality of access points and the another portable data terminal are disposed within a facility and facilitate communication among persons remotely located within the facility.

18. A portable data terminal for use in a portable data collection network including a backbone network and a plurality of access points coupled to the backbone network, the portable data terminal comprising:

a keypad for inputting data;

a barcode reader for inputting barcode information;

an RF transceiver for facilitating roaming of the portable data terminal among the plurality of access points and for wirelessly communicating at least one of data input via the keypad and barcode information read by the barcode reader to the backbone network by way of at least one of the plurality of access points;

a speaker; and a voice circuit operatively coupled to the RF transceiver and the speaker for receiving voice data via the RF transceiver, and for converting the voice data into a voice signal which is output through the speaker, the voice data originating from another portable data terminal.

19. The portable data terminal of claim 18, wherein the portable data terminal and the another portable data terminal communicate the voice data directly among each other.

20. The portable data terminal of claim 18, wherein the portable data terminal and the another portable data terminal communicate the voice data via the backbone network.

21. The portable data terminal of claim 20, wherein the voice data from the another portable data terminal is transmitted from the another portable data terminal to the backbone network by way of another of the plurality of access points.

22. The portable data terminal of claim 18, wherein the another portable data terminal comprises a keypad for inputting data; a barcode reader to inputting barcode information; an RF transceiver for wirelessly communicating at least one of data input via the keypad and barcode information read by the barcode reader to the backbone network by way of at least one of the plurality of access points; a microphone; and a voice circuit operatively coupled to the RF transceiver and the microphone for transmitting voice data obtained from the microphone via the RF transceiver.

23. The portable data terminal of claim 18, wherein the portable data terminal, the portable data collection network including the backbone network and the plurality of access points and the another portable data terminal are disposed within a facility and facilitate communication among persons remotely located within the facility.

* * * * *